(12) United States Patent
Mandal et al.

(10) Patent No.: US 9,774,596 B2
(45) Date of Patent: Sep. 26, 2017

(54) PRIVACY-PRESERVING BIOMETRIC AUTHENTICATION

(71) Applicant: FUJITSU LIMITED, Kawasaki-shi, Kanagawa (JP)

(72) Inventors: Avradip Mandal, San Jose, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 14/286,739

(22) Filed: May 23, 2014

(65) Prior Publication Data

US 2015/0341349 A1 Nov. 26, 2015

(51) Int. Cl.
*G06F 17/30* (2006.01)
*H04L 29/06* (2006.01)
*G06F 21/32* (2013.01)
*G06F 21/33* (2013.01)
*G06F 21/83* (2013.01)

(52) U.S. Cl.
CPC .......... *H04L 63/0861* (2013.01); *G06F 21/32* (2013.01); *G06F 21/33* (2013.01); *G06F 21/83* (2013.01); *H04L 29/06* (2013.01); *H04L 63/0884* (2013.01); *G06F 2221/2103* (2013.01); *H04L 63/0892* (2013.01)

(58) Field of Classification Search
CPC .. H04L 63/0861; H04L 63/0884; G06F 21/32
See application file for complete search history.

(56) References Cited

U.S. PATENT DOCUMENTS

2006/0206919 A1* 9/2006 Montgomery et al. ........... 726/2
2011/0264919 A1* 10/2011 Pizano et al. ................. 713/186
2013/0212645 A1* 8/2013 Takahashi ........................ 726/3

OTHER PUBLICATIONS

Dabbah, M. A., Dlay, S. S., & Woo, W. L. (Apr. 2008). PCA Authentication of Facial Biometric in the Secure Randomized Mapping Domain. In Information and Communication Technologies: From Theory to Applications, 2008. ICTTA 2008. 3rd International Conference on (pp. 1-5). IEEE.
N. K. Ratha, J. H. Connell, and R. M. Bolle, "Enhancing security and privacy in biometrics-based authentication systems," IBM systems Journal, vol. 40, pp. 614-634, 2001.

(Continued)

*Primary Examiner* — Mohammed Waliullah
(74) *Attorney, Agent, or Firm* — Maschoff Brennan (57) ABSTRACT

A method includes receiving a registration input including a first raw biometric template and a user identifier. The first raw biometric template may be representative of unique features of a biometric characteristic of a user associated with the user identifier. The method includes generating a first transformed biometric template by applying a random projection to the first raw biometric template and communicating the first transformed biometric template and the user identifier to an authentication server. The method includes receiving a challenge input including a second raw biometric template and the user identifier. The method includes generating a second transformed biometric template and communicating the second transformed biometric template and the user identifier to the authentication server. The method includes receiving a signal indicative of an authentication decision from the authentication server.

26 Claims, 5 Drawing Sheets

(56) References Cited

OTHER PUBLICATIONS

R. Belguechi, E. Cherrier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security , vol. 39, Sec, 3.3.
A. Juels and M. Sudan, "A fuzzy vault scheme," IEEE International Symposium on Information Theory, pp. 408, 2002.
Ari Juels and Martin Wattenberg. A fuzzy commitment scheme. In ACM CCS 99, pp. 28-36. ACM Press, Nov. 1999.
Ari Juels and Madhu Sudan. A fuzzy vault scheme. Cryptology ePrint Archive, Report 2002/093, 2002. http://eprint.acr.org/2002/093.
R. Belguechi, C. Rosenberger, and S. Aoudia, "Biohashing for securing minutiae template," in Proceedings of the 20th International Conference on Pattern Recognition, Washington, DC, USA, 2010, pp. 1168-1171.
Yevgeniy Dodis, Leonid Reyzin, and Adam Smith. Fuzzy extractors: How to generate strong keys from biometrics and other noisy data. In Christian Chachin and Jan Camenisch, editors, EUROCRYPT 2004, vol. 3027 of LNCS, pp. 523-540. Springer, May 2004.
Yevgeniy Dodis and Adam Smith. Correcting errors without leaking partial information. In Harold N. Gabow and Ronald Fagin, editors, 37th ACM STOC, pp. 654{663. ACM Press, May 2005.
P. Paillier, "Public-Key Cryptosystems Based on Composite Degree Residuosity Classes," Advances in Cryptology—EUROCRYPT '99 Lecture Notes in Computer Science vol. 1592, 1999, pp. 223-238. Apr. 15, 1999.
Yasuda, M., Shimoyama, T., Kogure, J., Yokoyama, K., Koshiba, T.: Practical packing method in somewhat homomorphic encryption. In: Data Privacy Management and Autonomous Spontaneous Security. Letters Notes in Computer Science, pp. 34-50. Springer, Mar. 2014.
C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.
S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/2013/774.
Shafi Goldwasser, Vipul Goyal, Abhishek Jain, and Amit Sahai. Multi-input functional encryption. Cryptology ePrint Archive, Report 2013/727, 2013. http://eprint.iacr.org/2013/727.
Ran Canetti. Towards realizing random oracles: Flash functions that hide all partial information. In Burton S. Kaliski Jr., editor, CRYPTO '97, vol. 1294 of LNCS, pp. 455{469. Springer, Aug. 1997.
Boaz Barak, Yevgeniy Dodis, Hugo Krawczyk, Olivier Pereira, Krzysztof Pietrzak, Francois-Xavier Standaert, and Yu Yu. Leftover hash lemma, revisited. In Phillip Rogaway, editor, CRYPTO 2011, vol. 6841 of LNCS, pp. 1{20. Springer, Aug. 2011.
Russell Impagliazzo, Leonid A. Levin, and Michael Luby. Pseudorandom generation from one-way functions (extended abstracts). In 21st ACM STOC, pp. 12{24. ACM Press, May 1989.

* cited by examiner

PRIVACY-PRESERVING BIOMETRIC AUTHENTICATION

FIELD

The embodiments discussed herein are related to privacy-preserving biometric authentication.

BACKGROUND

A form of user authentication may include biometric authentication. Biometric authentication generally includes measuring a biometric characteristic of a user that is unique to the user. The measured biometric characteristic, or a representation thereof, is then used as a basis of authenticating an identity of the user. Biometric characteristics may include a user's fingerprints, irises, veins, a section of deoxyribonucleic acid (DNA), and the like. Biometric authentication may have an advantage of allowing the user to be authenticated without having to remember a password. However, because the biometric characteristic may be unchangeable (unlike a password), privacy is important in biometric authentication systems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes receiving a registration input. The registration input may include a first raw biometric template and a user identifier. The first raw biometric template may be representative of unique features of a biometric characteristic of a user associated with the user identifier. The method may include generating a first transformed biometric template by applying a random projection to the first raw biometric template. The method may include communicating the first transformed biometric template and the user identifier to an authentication server. The method may include receiving a challenge input. The challenge input may include a second raw biometric template and the user identifier. The method may include generating a second transformed biometric template by applying the random projection to the second raw biometric template. The method may include communicating the second transformed biometric template and the user identifier to the authentication server. The method may include receiving a signal indicative of an authentication decision from the authentication server. The authentication decision may be based on an approximate matching between the second transformed biometric template and the first transformed biometric template.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A challenge of biometric authentication may be that a user may not change a biometric characteristic used as a basis for authentication. For example, the user may register a biometric template including biometric data describing one or more unique characteristics of the user such as a fingerprint of the user or an iris pattern of the user. If the biometric template is compromised, then the user may not be able to change the unique characteristics described by the biometric template. Thus, once compromised, another biometric template may be registered or a biometric template of another biometric characteristic may be registered. For at least this reason, biometric authentication systems may benefit from a strong privacy guarantee.

In some biometric authentication systems various approaches have been implemented to attempt to provide a secure biometric authentication system. For example, some biometric authentication systems implement a "feature transformation approach," a "biometric cryptosystem approach," and/or a "homomorphic encryption approach." However each of these approaches provides limited privacy and security due at least partially to the communication of information such as biometric templates, client-specific keys, public keys, and the like, each of which may be compromised.

Accordingly, some embodiments discussed herein relate to privacy-preserving biometric authentication. An example embodiment includes a method of biometric authentication. The method may include receiving a registration input. The registration input may include a first raw biometric template and a user identifier. The first raw biometric template may be representative of unique features of a biometric characteristic of a user associated with the user identifier. The method may include generating a first transformed biometric template by applying a random projection to the first raw biometric template. The method may include communicating the first transformed biometric template and the user identifier to an authentication server. The method may include receiving a challenge input. The challenge input may include a second raw biometric template and the user identifier. The second raw biometric template may be representative of the one or more unique features of the biometric characteristic of the user that is associated with the user identifier. The method may include generating a second transformed biometric template by applying the random projection to the second raw biometric template. The method may include communicating the second transformed biometric template and the user identifier to the authentication server. The method may include receiving a signal indicative of an authentication decision from the authentication server. The authentication decision may be based on an approximate matching between the second transformed biometric template and the first transformed biometric template. In particular, in some embodiments, the approximate matching may be quantified as a hamming distance calculated between the second transformed biometric template and the first transformed biometric template. In response to the hamming distance being below a transformed hamming threshold, it may be determined that there is an approximate match between the second transformed biometric template and the first transformed biometric template. Embodiments of the present invention will be explained with reference to the accompanying drawings.

Figure 1A:
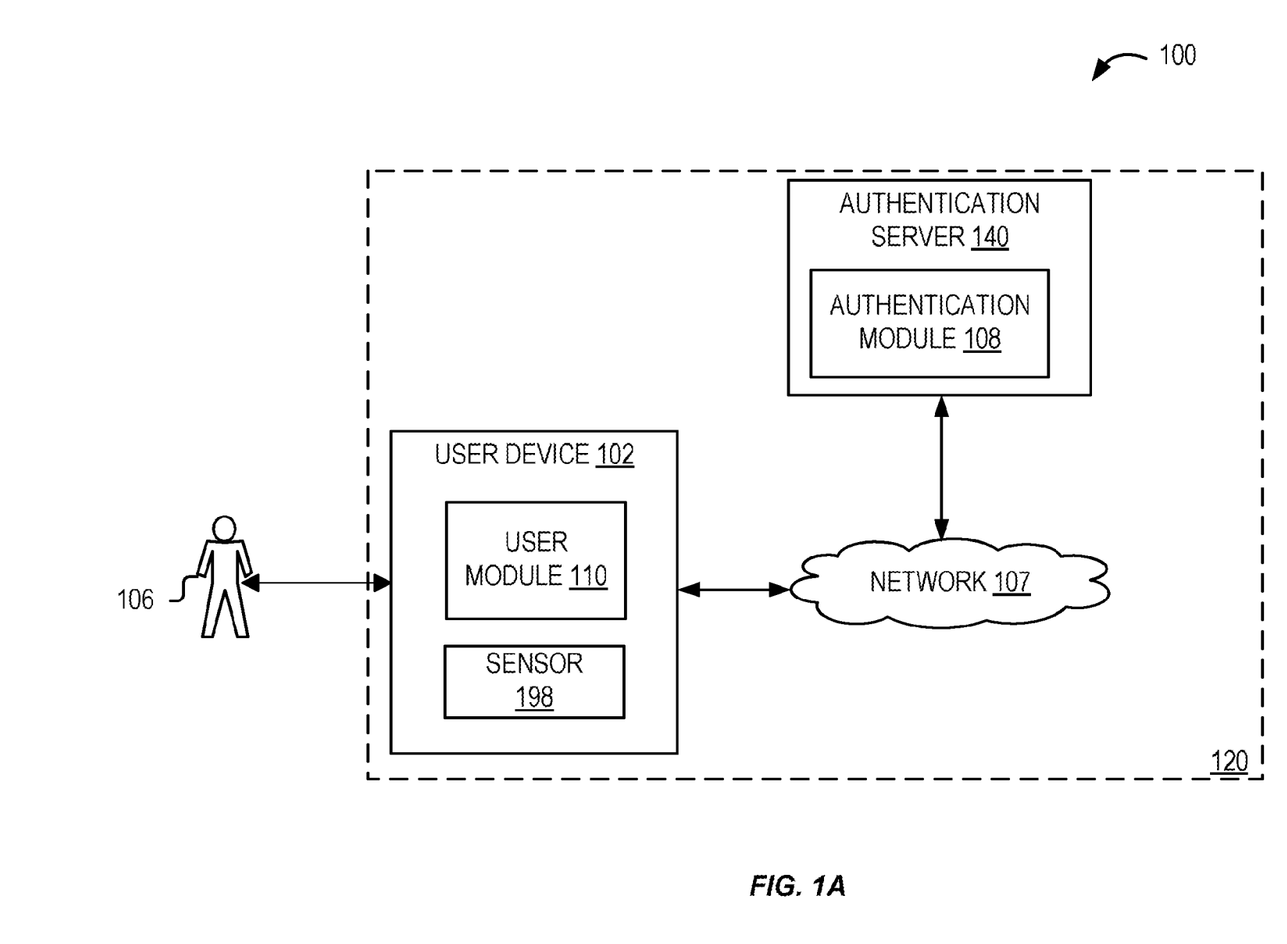
FIG. 1A is a block diagram of an example operating environment.

FIG. 1A illustrates a block diagram of an example operating environment 100, arranged in accordance with at least one embodiment described herein. In the operating environment 100, biometric authentication of a user 106 may be performed by an authentication server 140.

The operating environment 100 includes the user 106, a user device 102, the authentication server 140, and a network 107. The user device 102 may be communicatively coupled to the authentication server 140 via the network 107. The user device 102 and the authentication server 140 generally make up a biometric authentication system 120 in which a biometric template of the user 106 may be registered. The registered template may then be used to authenticate the identity of the user 106. For example, the user device 102 may communicate a first biometric template, among potentially other information, to the authentication server 140 via the network 107. The first biometric template may be stored at the authentication server 140 as a registered template. The user device 102 may then communicate a second biometric template, among potentially other information, to the authentication server 140 via the network 107. The authentication server 140 may communicate signals indicative of an authentication decision, which may be made at the authentication server 140, to the user device 102.

As illustrated in FIG. 1A, the authentication server 140 may include an authentication module 108 and the user device 102 may include a user module 110. Generally, the authentication module 108 and the user module 110 may be configured to communicate and process information and data used to authenticate an identity of the user 106 using biometric authentication.

The network 107 may include a wired or wireless network, and may have numerous different configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes BLUETOOTH® communication networks or a cellular communications network for sending and receiving data including via short messaging service (SMS), multimedia messaging service (MMS), hypertext transfer protocol (HTTP), direct data connection, WAP, email, etc.

The authentication server 140 may include a processor-based computing device. For example, the authentication server 140 may include a hardware server or another processor-based computing device configured to function as a server. The authentication server 140 may include memory and network communication capabilities. In the operating environment 100, the authentication server 140 may be configured to communicate with the user device 102 via the network 107.

The authentication server 140 may include the authentication module 108. The authentication module 108 may include code and/or routines configured to provide a biometric authentication service. The authentication module 108 may be stored on the memory of the authentication server 140. The authentication module 108 may be configured to be executable by a processor of the authentication server 140.

The user 106 may include an individual that has one or more biometric characteristics. The biometric characteristics may include one or more unique features. For example, the biometric characteristics may include a fingerprint of the user 106 that includes patterns of ridges and/or furrows. The user 106 may be associated with the user device 102 in some embodiments. For example, the user 106 may own or regularly operate the user device 102. In some embodiments, the user 106 may not be specifically associated with the user device 102. For example, the user device 102 may be publicly accessible to multiple users including the user 106.

The user 106 may use the user device 102 to access the authentication server 140 via the network 107. For example, the user 106 may operate the user device 102 to access a biometric authentication service provided by the authentication module 108 of the authentication server 140. When the user 106 accesses the authentication server 140, the authentication module 108 may provide a biometric authentication service. The biometric authentication service may be used to identify the user 106 and/or to confirm the identity of the user 106 based on the biometric characteristic of the user 106 that is measured.

The user device 102 may include a processor-based computing device. The user device 102 may include memory, a processor, and network communication capabilities. In the operating environment, the user device 102 may be capable of communicating data and information to the authentication server 140 via the network 107. Some examples of the user device 102 may include a mobile phone, a scanning device, a smartphone, a tablet computer, a laptop computer, a desktop computer, a set-top box, or a connected device (e.g., a smartwatch, smart glasses, a smart pedometer, or any other connected device).

The user device 102 may include a sensor 198. The sensor 198 may include a hardware device. The sensor 198 may be configured to measure or otherwise capture the biometric characteristic used to authenticate the user 106. When the biometric characteristic of the user 106 is measured or otherwise captured, the user device 102 may generate a biometric template. The biometric template is representative of the biometric characteristic and may include at least some of the unique features of the biometric characteristic of the user 106. The biometric template may include a graphical representation and/or algorithmic representation of the biometric characteristic, for example.

Some examples of the sensor 198 may include: a fingerprint scanner; a camera configured to capture an image of an iris; a device configured to measure DNA; a heart rate monitor configured to measure heart rate; a wearable electromyography sensor configured to capture electrical activity produced by skeletal muscles; or any other sensor 198 configured to measure or otherwise capture a biometric characteristic associated with users such as the user 106.

In the illustrated operating environment 100, the sensor 198 is included in the user device 102. In other embodiments, the sensor 198 may be communicatively coupled to the user device 102 or a processor included therein. For example, the sensor 198 may be configured to communicate a signal to the user device 102 via the network 107. Although only one sensor 198 is depicted in FIG. 1A, in some embodiments the user device 102 may include one or more sensors 198.

The user module 110 of the user device 102 may include code and routines stored on a memory of the user device 102. The user module 110 may be executable by a processor of the user device 102. The user module 110 may be configured to communicate and process information and data related to biometric authentication of the user 106.

Modifications, additions, or omissions may be made to the operating environment 100 without departing from the scope of the present disclosure. Specifically, embodiments depicted in FIG. 1A include one user 106, one user device 102, and one authentication server 140. However, the present disclosure applies to operating environments that may include one or more users 106, one or more user devices 102, one or more authentication servers 140, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments, the user module 110 and/or one or more functionalities attributed thereto may be performed by a module on the authentication server 140.

The authentication module 108 and/or the user module 110 may include code and routines for biometric authentication. In some embodiments, the authentication module 108 and/or the user module 110 may act in part as a thin-client application that may be stored on the user device 102 or another computing device, and in part as components that may be stored on the authentication server 140, for instance. In some embodiments, the authentication module 108 and/or the user module 110 may be implemented using hardware including a field-programmable gate array (FPGA) or an application-specific integrated circuit (ASIC). In some other instances, the authentication module 108 and/or the user module 110 may be implemented using a combination of hardware and software.

In the operating environment 100, memory such as memory in the user device 102 and the authentication server 140 may include a non-transitory memory that stores data for providing the functionality described herein. The memory may be included in storage that may include a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 1B:
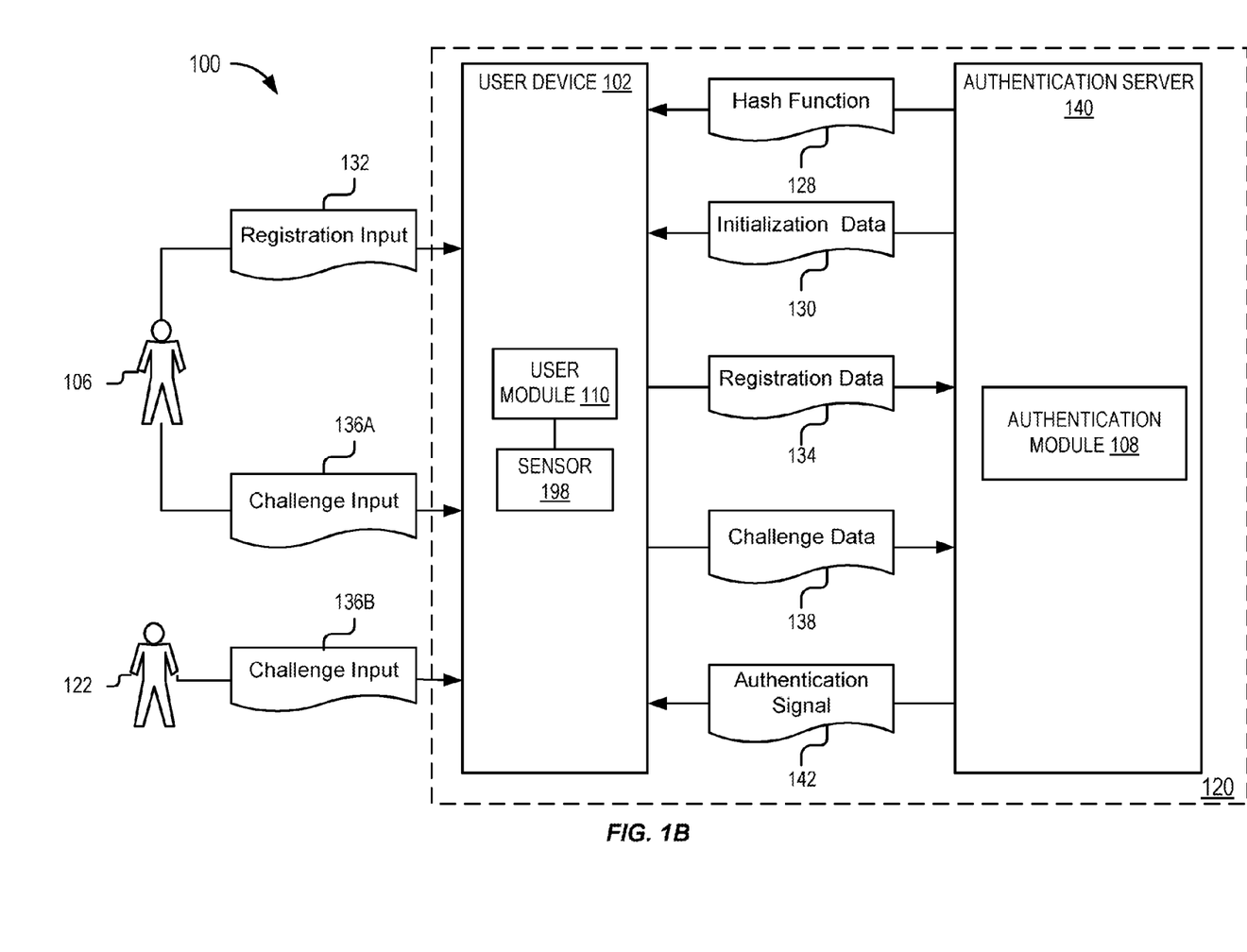
FIG. 1B is a block diagram of an example biometric authentication system.

FIG. 1B is a block diagram of the operating environment 100 of FIG. 1A depicting some details of an example authentication service that may be provided in the biometric authentication system 120. In FIG. 1B, the network 107 is omitted. However, communication in the biometric authentication system 120 between the user device 102 and the authentication server 140 may occur via the network 107 of FIG. 1A.

The authentication service may include a registration process and an authentication process. The registration process may include obtaining information and data from the user 106 that may be used in the authentication process. The authentication process may occur later in time (e.g., subsequent to the registration process). In the authentication process, the identity of the user 106 may be authenticated based on the biometric template provided by the user 106 and/or the identity of an imposter 122 may not be authenticated based on a biometric template provided by the imposter 122.

In the authentication service depicted in FIG. 1B, the biometric templates communicated from the user device 102 to the authentication server 140 may be transformed. Transforming the biometric templates may limit access by unauthorized parties to the biometric templates of the user 106.

For example, biometric templates may be generated from a measured biometric characteristic of the user 106. The biometric templates generated from the measured biometric characteristic are herein referred to as "raw biometric templates." The raw biometric templates may be transformed to abstract or remove some of the data included therein. In some embodiments, the raw biometric templates may be transformed by applying a random projection to the raw biometric templates. As used herein, the biometric templates that exist after the application of the random projections are referred to as "transformed biometric templates." The transformed biometric templates may then be communicated from the user device 102 to the authentication server 140. Some additional details of the authentication service are discussed below.

In the registration process, the authentication module 108 may publish or otherwise make available a hash function description 128 (In FIG. 1B, "hash function"). The hash function description 128 may include a random matrix. The random matrix may be used to transform the raw biometric templates. For example, transforming the raw biometric templates may include applying a random projection of the random matrix to the raw biometric templates.

By applying the random projection, the dimension of the raw biometric template may be reduced. For example, the raw biometric templates generated by the user module 110 may include a raw template dimension that may be equal to 2048 dimensions. After the application of the random projection, a corresponding transformed biometric template may include a transformed template dimension that may be equal to about 1000 dimensions.

In some embodiments, the random matrix may include elements that each has a value of zero or one. A probability of a particular element of the random matrix being one may be set according to a particular probability. The particular probability may be selected. For example, the particular probability may be selected as 1/2000. Thus, in this example, the probability of a particular element being one is 1/2000 and accordingly, the probability of the particular element being zero is 1999/2000.

Additionally, the random matrix may have a size that is related to a dimensional change of the biometric templates because of the application of the random projection. For example, the size of the random matrix may include the raw template dimension multiplied by the transformed template dimension. In some embodiments, the random matrix may be defined according to a random matrix expression:

$$R \in Z_2^{k \times n}$$

In the random matrix expression, R represents the random matrix. The operator $\in$ represents a membership operator. A parameter n represents the raw template dimension. A parameter k represents the transformed template dimension. The parameter $Z_n^{k \times n}$ represents an integer matrix including integers 0 and 1 having a size (k×n).

The client module 110 may receive a registration input 132. The registration input 132 may include a first raw biometric template, a measured biometric characteristic, and a user identifier. For example, in some embodiments, the sensor 198 may measure the biometric characteristic and communicate the biometric characteristic to the client module 110. Additionally or alternatively, the sensor 198 may measure the biometric characteristic and communicate the biometric characteristic to another system (not shown). The other system may generate a first raw biometric template based on the biometric characteristic and communicate the first raw biometric template to the client module 110.

As mentioned above, the first raw biometric template included in the registration input 132 may be representative of one or more unique features of a biometric characteristic of the user 106. In some embodiments, the first raw biometric template may be defined according to a first raw biometric template expression:

$$X_T \epsilon \{0,1\}^n$$

In the first raw biometric template expression, the parameters n and the operator $\epsilon$ are as above. $X_T$ represents the first raw biometric template. The expression $\{0,1\}^n$ represents a vector space having a dimension of the raw template dimension "n."

The user identifier may include an alphanumeric code, for instance, or any other unique sequence that is associated with the user 106. The user identifier may be used as a simple identifier for the user 106. The user 106 may input the user identifier to the user device 102. For example, to enter the user identifier, the user 106 may type the user identifier, may swipe a card, may speak some phrase, touch some portion of a screen, and the like.

The user module 110 may generate a first transformed biometric template based on the registration input 132. For example, the first transformed biometric template may include a random projection applied to the first raw biometric template included in the registration input 132 or derived from a measured biometric characteristic included in the registration input 132.

In some embodiments, the first transformed biometric template may be defined according to a first transformed biometric template expression:

$$X_T' = RX_T \epsilon \{0,1\}^k$$

In the first transformed biometric template expression, the parameters R, $X_T$, k, and $\epsilon$ are as described above. The parameter $X_T'$ represents the first transformed biometric template. The expression $\{0,1\}^k$ represents a vector space having a dimension of the transformed template dimension "k."

The first transformed biometric template may be included in registration data 134. The registration data 134 may additionally include the user identifier. The user module 110 may communicate the registration data 134 to the authentication module 108 of the authentication server 140.

The authentication module 108 may receive the registration data 134. The registration data may include the first transformed biometric template and the user identifier. The authentication module 108 may store the first transformed biometric template as a registration template for the user 106. For example, the registration template may be stored in memory of the authentication server 140 or at a remote site configured to store the registration template.

The registration template may be stored according to the user identifier. For example, the user identifier may be used as an index for the registration template for the user 106. For example, in some embodiments, multiple users may each communicate registration data 134 to the authentication module 108. The authentication module 108 may store a registration template for each of the multiple users, each of which may be stored and/or indexed according to a corresponding user identifier.

In some embodiments, the authentication module 108 may encrypt the registration template. By encrypting the registration template, an additional layer of security may be added in the biometric authentication system 120.

The user module 110 may then receive a first challenge input 136A or a second challenge input 136B. The first challenge input 136A and the second challenge input 136B may include or represent an attempt by the user 106 or the imposter 122 to have their identity authenticated. The first challenge input 136A and/or the second challenge input 136B may include a second raw biometric template, a second biometric characteristic, and a corresponding user identifier. The second raw biometric template may be representative of the unique features of the biometric characteristic of the user 106 or of the imposter 122.

In some embodiments, the second raw biometric template may be defined according to a second raw biometric template expression:

$$Y_T \epsilon \{0,1\}^n$$

In the second raw biometric template expression, the parameters n, the operator $\epsilon$, and the expression $\{0,1\}^n$ are as above. $Y_T$ represents the second raw biometric template.

In general, even when the second raw biometric template originates with the user 106 and not the imposter 122, there may be some differences between the first raw biometric template and the second raw biometric template. To measure an approximate similarity between the first raw biometric template and the second raw biometric template, a hamming distance may be determined between the first raw biometric template and the second raw biometric template. Generally, the hamming distance may include a quantification of a minimum number of substitutions to change one template to another template. In circumstances in which the imposter 122 is the origin of the second raw biometric template, the hamming distance between the first raw biometric template and the second raw biometric template may be higher than when the user 106 is the origin of the second raw biometric template.

The user module 110 may then generate a second transformed biometric template. The second transformed biometric template may include a random projection applied to the second raw biometric template that may be included in the first or second challenge input 136A and/or 136B.

In some embodiments, the second transformed biometric template may be defined according to a second transformed biometric template expression:

$$Y_T' = RY_T \epsilon \{0,1\}^k$$

In the second transformed biometric template expression, the parameters R, $Y_T$, k, $\epsilon$, and the expression $\{0,1\}^k$ are as described above. The parameter $Y_T'$ represents the second transformed biometric template.

The second transformed biometric template and/or the user identifier may be included in challenge data 138. The user module 110 may then communicate the challenge data 138 including the second transformed biometric template and the user identifier to the authentication module 108 of the authentication server 140.

The authentication module 108 may receive the challenge data 138. The authentication module 108 may then retrieve the registration template for the user 106. For example, using the user identifier as an index, the authentication module 108 may retrieve the registration template from memory.

The authentication module 108 may determine an approximate similarity between the registration template and the second transformed biometric template. The approximate similarity may be quantified by a hamming distance between the registration template and the second transformed biometric template.

The hamming distance may be relatively consistent despite the transformation involving the application of the random projection to the raw biometric template. Accordingly, the hamming distance being below a transformed hamming threshold may be an indication of the approximate similarity between the registration template and the second transformed biometric template, which may further indicate an approximate similarity between the first raw biometric template and the second raw biometric template.

Thus, if the first challenge input 136A that is provided by the user 106 is the basis of the second transformed biometric template, then the hamming distance between the second transformed biometric template and the registered template of the user 106 may be below the transformed hamming threshold. Specifically, because the user 106 is providing the registration input 132 and the first challenge input 136A, the registered template and the second transformed biometric templates may be similar.

However, if the second challenge input 136B that is provided by the imposter 122 is the basis of the second transformed biometric template, then the hamming distance between the second transformed biometric template and the registered template of the user 106 may be above the transformed hamming threshold. Specifically, because the user 106 provides the registration input 132 and the imposter 122 provides the second challenge input 136B, the registered template and the second transformed biometric templates may be dissimilar.

Based on a determination of the approximate similarity, the authentication module 108 may make an authentication decision. For example, the authentication module 108 may determine whether the challenge data 138 originates at the user 106 or the imposter 122. In response to the hamming distance being below the transformed hamming threshold, the authentication module 108 may communicate an authentication signal 142 indicative of the authentication decision. In some embodiments, the authentication signal 142 may include a "yes" or a "no" or equivalent indication and/or in response to the hamming distance being above the transformed hamming threshold, the authentication module 108 may not communicate the authentication signal.

The user module 110 may receive the authentication signal 142. Additionally or alternatively, in embodiments in which the authentication module 108 does not communicate the authentication signal 142 in response to the hamming distance being higher than the transformed hamming threshold, the user module 110 may wait for a particular time period. After the particular time period, the user module 110 may conclude that the authentication decision has been made that the challenge data 138 may not belong to the user 106.

In some embodiments, the user module 110 and/or the authentication module 108 may select the transformed hamming threshold and/or the initialization data 130. The authentication module 108 may publish or otherwise make available initialization data 130. The initialization data 130 may include a first hamming value, a second hamming value, and the particular probability, for example. The first hamming value and the second hamming value may include particular values of a hamming distance calculated between the first raw biometric template and the second raw biometric template. The first hamming value and the second hamming value may include particular thresholds or limits with respect to which the transformed hamming threshold may be defined or selected.

In some embodiments, the second hamming value may be selected to be less than the transformed template dimension and/or the second hamming value may be selected to be greater than the first hamming value. Additionally, the first and second hamming values may be selected in relationship to a hamming distance between the first raw biometric template and the second raw biometric template (a raw hamming distance) and a hamming distance between the first transformed biometric template and the second transformed biometric template (a transformed hamming distance). For example, the first and second hamming values may be selected such that when a raw hamming distance is less than the first hamming value, then a probability of a transformed hamming distance being greater than the transformed hamming threshold is less than a particular value such as 1 in 10,000. Additionally, the first and second hamming values may be selected such that when a raw hamming distance is greater than the second hamming value, then a probability of the transformed hamming distance being less than or equal to the transformed hamming threshold is less than the particular value.

For example, the first and second hamming values and/or the transformed hamming threshold may be selected according to example hamming distance expressions:

If $\text{dist}(X_T, Y_T) < \delta_1$, then $Pr[\text{dist}(X_{T'}, Y_{T'}) > \delta'] < 1/10000$ If $\text{dist}(X_T, Y_T) \geq \delta_2$, then $Pr[\text{dist}(X_{T'}, Y_{T'}) \leq \delta'] < 1/10000$ In the hamming distance expressions, the parameters $X_T$, $Y_T$, $X_{T'}$, $Y_{T'}$ are as above. The operator $\text{dist}(\ )$ represents a hamming distance function. The parameter $\delta_1$ represents the first hamming value. The parameter $\delta_2$ represents the second hamming value. The parameter $\delta'$ represents the transformed hamming threshold. The operator $Pr[\ ]$ represents a probability operator.

In at least one example embodiment, the raw template dimension may be equal to 2048, the transformed template dimension may be equal to 1000, and the particular probability may be equal to 1/2000. In these example embodiments, the first hamming value may be equal to 200, the second hamming value may be equal to 600, and the transformed hamming threshold may be equal to 150. Alternatively, in these example embodiments, the first hamming value may be equal to 400, the second hamming value may be equal to 1000, and the transformed hamming threshold may be equal to 235.

A metric of the biometric authentication system 120 may be a privacy guarantee. The privacy guarantee may quantify a value for the chances the imposter 122 may access raw biometric template if the data (e.g., the registration data 134 or the challenge data 138) communicated between the user module 110 and the authentication module 108 is compromised. Accordingly, the privacy guarantee may be related to the relationship between the transformed biometric templates and the raw biometric templates.

In embodiments in which the first and second hamming values and/or the transformed hamming threshold are selected according to the hamming distance expressions or in some other embodiments, a privacy guarantee may be defined according to an example privacy guarantee expression:

$$\text{For any } R \in Z_2^{k \times n}, \text{ given } X_T' = RX_T, |\{Z_T \in \{0,1\}^n : RZ_T = X_T'\}| \geq 2^{n-k}$$

In the privacy guarantee expression, R, $\epsilon$, $Z_2^{k \times n}$, $X_T'$, $X_T$, $\{0,1\}^n$, n, and k are as described above. The operator : is a "such that" operator. The parameter $Z_T$ represents a raw biometric template other than $X_T$. Generally, the privacy guarantee means that there are at least $2^{n-k}$ possible values of raw biometric templates that are possible if the transformed biometric template is compromised. From the example above, in which the raw template dimension is equal to 2048 dimensions and the transformed template dimension is equal to 1000 dimensions, if the first transformed biometric template is compromised, then there may be $2^{1048}$ possible raw biometric templates that may result in the first transformed biometric template.

Figure 2:
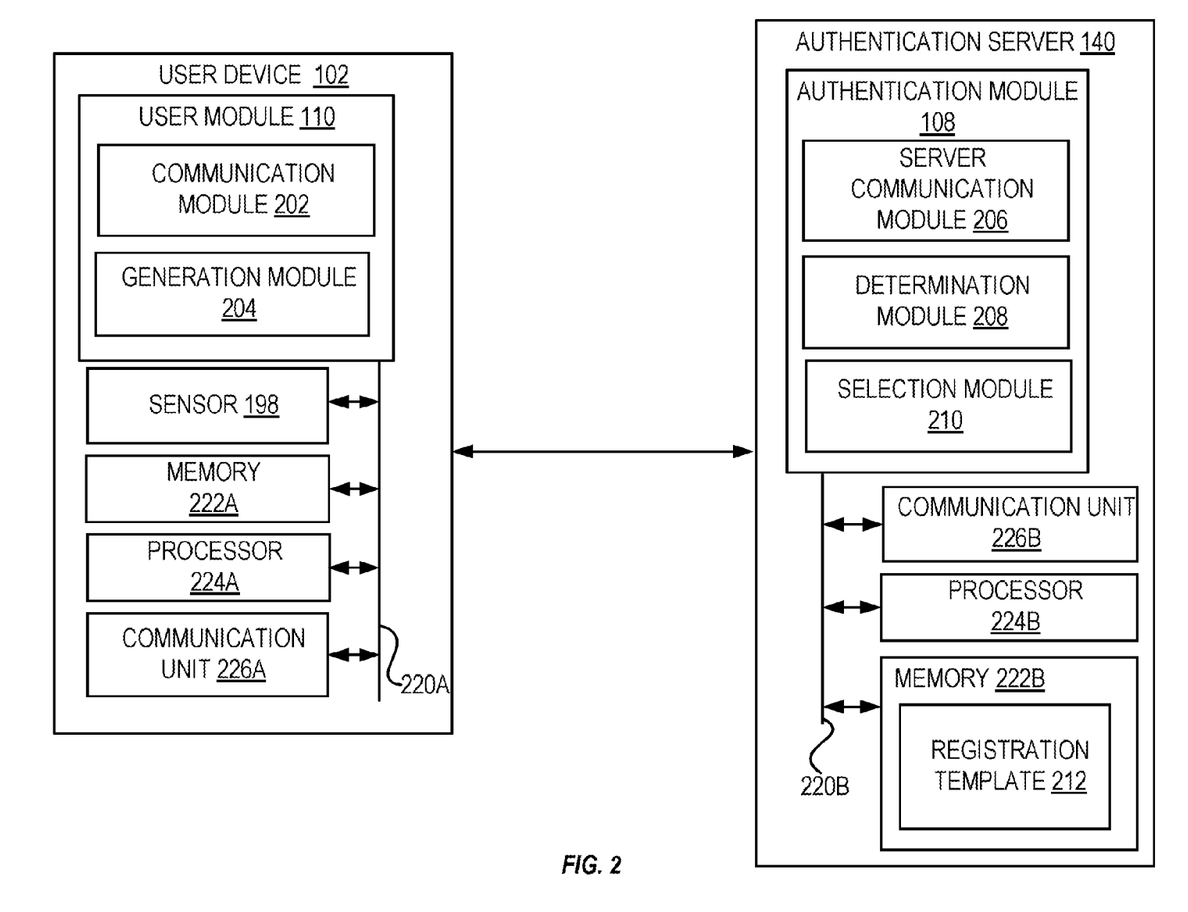
FIG. 2 is a block diagram of an example system for providing biometric authentication.

FIG. 2 is a block diagram of an example of the user device 102 and an example of the authentication server 140. The user device 102 may include the user module 110, a processor 224A, a memory 222A, and a communication unit 226A. The user module 110, the processor 224A, the memory 222A, and the communication unit 226A may be coupled via a bus 220A. The authentication server 140 may include the authentication module 108, a processor 224B, a memory 222B, and a communication unit 226B. The authentication module 108, the processor 224B, the memory 222B, and the communication unit 226B may be coupled via a bus 220B. The processors 224A and 224B are referred to generally herein as the processor 224 or the processors 224, the memories 222A and 222B are referred to generally herein as the memory 222, the communication units 226A and 226B are referred to generally herein as the communication unit 226 or the communication units 226, and the buses 220A and 220B are referred to generally herein as the bus 220 or the buses 220.

With combined reference to FIGS. 1 and 2, the processors 224 may include an arithmetic logic unit (ALU), a microprocessor, a general-purpose controller, or some other processor array to perform computations and privacy preservation. The processors 224 may be coupled to the buses 220 for communication with the other components (e.g., 108, 110, 198, 222, and 226). The processors 224 generally process data signals and may include various computing architectures including a complex instruction set computer (CISC) architecture, a reduced instruction set computer (RISC) architecture, or an architecture implementing a combination of instruction sets. In FIG. 2 the user device 102 and the authentication server 140 each include a single processor 224. However, the user device 102 and/or the authentication server 140 may include multiple processors in other embodiments. Other processors, operating systems, and physical configurations may also be possible.

The memory 222 may be configured to store instructions and/or data that may be executed by one or more of the processors 224. The memory 222 may be coupled to the buses 220 for communication with the other components. The instructions and/or data may include code for performing the techniques or methods described herein. The memory 222 may include a DRAM device, an SRAM device, flash memory, or some other memory device. In some embodiments, the memory 222 also includes a nonvolatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication units 226 may be configured to transmit and receive data to and from one or more of the user device 102 and/or the authentication server 140. The communication unit 226 may be coupled to the buses 220. In some embodiments, the communication unit 226 includes a port for direct physical connection to the network 107 or to another communication channel. For example, the communication unit 226 may include a USB, SD, CAT-5, or similar port for wired communication with the components of the operating environment 100 of FIG. 1. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a cellular communications transceiver for sending and receiving data over a cellular communications network including via SMS, MMS, HTTP, direct data connection, WAP, email, or another suitable type of electronic communication. In some embodiments, the communication unit 226 includes a wired port and a wireless transceiver. The communication unit 226 may also provide other connections to the network 107 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 2, the user module 110 may include a communication module 202 and a generation module 204. The authentication module 108 may include a server communication module 206, a determination module 208, and a selection module 210. One or more of the communication module 202, the generation module 204, the server communication module 206, the determination module 208, and the selection module 210 (collectively, authentication modules) may be implemented as software including one or more routines configured to perform one or more operations described herein. The authentication modules may include a set or sets of instructions executable by the processors 224 to provide the functionality described herein. In some instances, the authentication modules may be stored in or at least temporarily loaded into the memory 222 and may be accessible and executable by one or more of the processors 224. One or more of the authentication modules may be adapted for cooperation and communication with one or more of the processors 224 via one or more of the buses 220.

The communication module 202 and/or the server communication module 206 may be configured to handle communications between the user module 110 or the authentication module 108, respectively, and other components of the user device 102 or the authentication server 140 (e.g., 222, 224, and 226). The communication module 202 and/or the server communication module 206 may be configured to send and receive data, via the communication unit 226, to and from the user device 102 or the authentication server 140. In some instances, the communication module 202 and/or the server communication module 206 may cooperate with the other modules (e.g., 232, 230, and 234) to receive and/or forward, via the communication unit 226, data from the user device 102 or the authentication server 140.

For example, in some embodiments, the server communication module 206 may be configured to publish initialization data and a hash function description. The hash function description may include a random matrix. The server communication module 206 may publish the initialization data and/or the random matrix to the communication module 202 of the user module 110. Alternately or additionally, the server communication module 206 may send the initialization data and/or the random matrix to the communication module 202 responsive to a request from the communication module 202.

The communication module 202 may be configured to receive a registration input. Additionally or alternatively, the communication module 202 may be configured to access or receive the initialization data and/or the hash function description and communicate the initialization data and/or the hash function description to the generation module 204. The registration input may be received at least partially from a user such as the user 106 of FIGS. 1A and 1B. The registration input may include a first raw biometric template and a user identifier. The first raw biometric template may be representative of one or more unique features of a biometric characteristic of the user that is associated with the user identifier. The biometric characteristic may be measured by the sensor 198 in some embodiments. The first raw biometric template may be based on the measured biometric characteristic. The communication module 202 may communicate the first raw biometric template to the generation module 204.

The generation module 204 may be configured to receive the first raw biometric template and generate a first transformed biometric template based thereon. The first transformed biometric template may be generated by applying a random projection to the first raw biometric template. The random projection may be based on the random matrix. For example, the random matrix may be projected onto a raw biometric template. The generation module 204 may then communicate the first transformed biometric template to the communication module 202, which may further communicate the first transformed biometric template to the server communication module 206.

The server communication module 206 may receive the registration data. The registration data may include the first transformed biometric template and the user identifier. The server communication module 206 may communicate the first transformed biometric template to the memory. The first transformed biometric template may be stored as a registration template 212 for a user associated with the user identifier.

The communication module 202 may then receive a challenge input. The challenge input may be received at least partially from a user such as the user 106 of FIGS. 1A and 1B. The challenge input may include a second raw biometric template and the user identifier. The second raw biometric template may be representative of one or more unique features of the biometric characteristic of the user that is associated with the user identifier. As above, the biometric characteristic may be measured by the sensor 198. The second raw biometric template may be based on the measured biometric characteristic. The communication module 202 may communicate the second raw biometric template to the generation module 204.

The generation module 204 may be configured to receive the second raw biometric template and generate a second transformed biometric template based thereon. The second transformed biometric template may be generated by applying a random projection to the second raw biometric template. The random projection may be based on the random matrix. The generation module 204 may then communicate the second transformed biometric template to the communication module 202, which may further communicate the second transformed biometric template to the server communication module 206.

The server communication module 206 may receive challenge data that may include the second transformed biometric template and the user identifier. The server communication module 206 may then retrieve the registration template 212 based on the user identifier. The server communication module 206 may then communicate the registration template 212 and the challenge data to the determination module 208.

The determination module 208 may determine an approximate similarity between the registration template 212 and the second transformed biometric template. The approximate similarity determination may be a basis of an authentication decision made by the authentication server 140. The approximate similarity may be based on a hamming distance. For example, in response to the hamming distance being below a transformed hamming threshold, the determination module 208 may communicate a signal to the server communication module 206 indicating that the hamming distance is below the transformed hamming threshold and/or that the user's identity is authenticated. In response to the hamming distance being above the transformed hamming threshold, the determination module 208 may communicate a signal to the server communication module 206 indicating that the hamming distance is above the transformed hamming threshold and/or that the user's identity is not authenticated.

The server communication module 206 may then communicate an authentication signal in response to the signal from the determination module 208. The server communication module 206 may not communicate the authentication signal to the user module 106 in response to the signal from the determination module 208 indicating that the hamming distance is above the transformed hamming threshold and/or that the user's identity is not authenticated. Alternately or additionally, the server communication module 206 may communicate an authentication signal indicating that the user's identity is not authenticated in response to the signal from the determination module 208 indicating that the hamming distance is above the transformed hamming threshold and/or that the user's identity is not authenticated. The communication module 202 may receive the signal indicative of an authentication decision from the authentication server 140, or more particularly from the server communication module 206.

Figure 3:
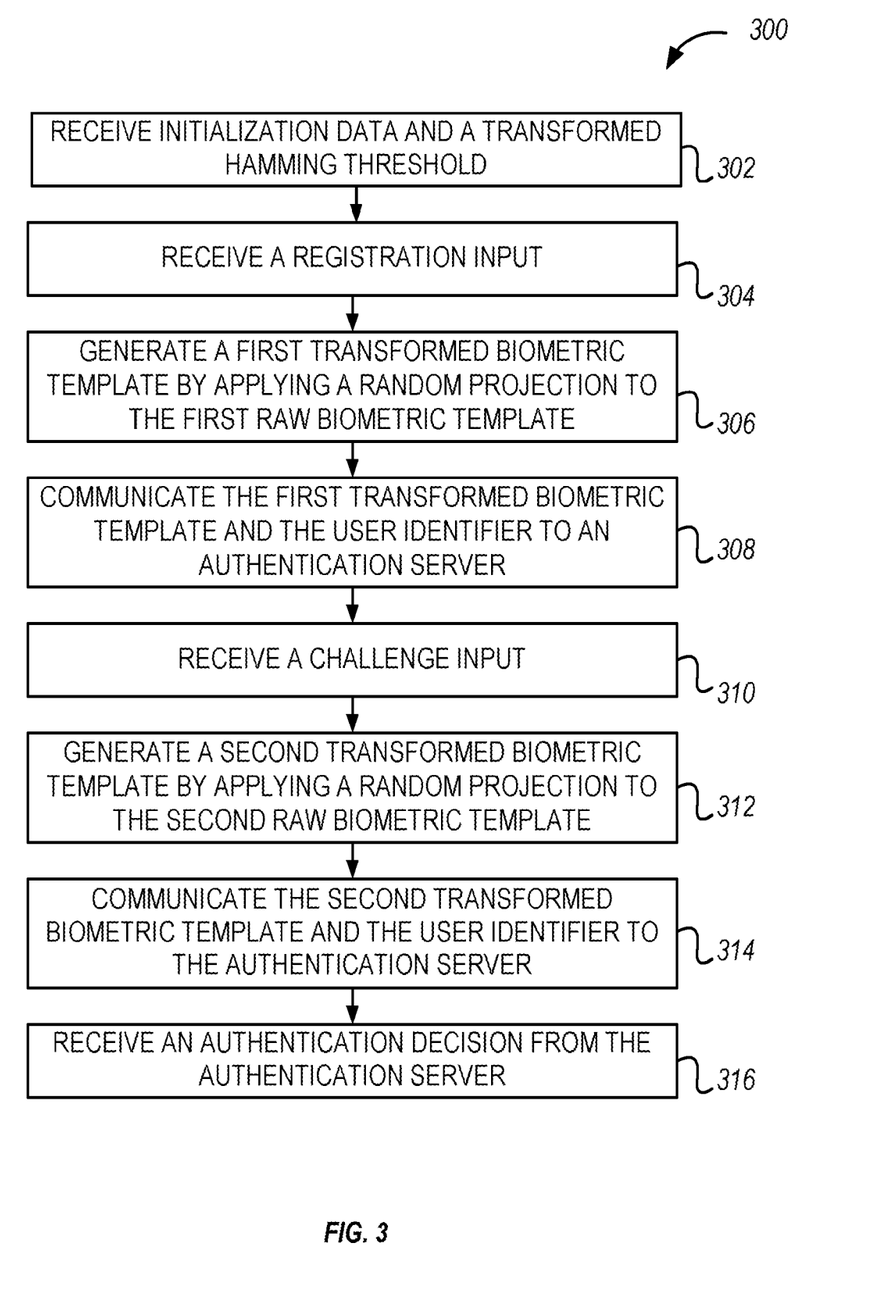
FIG. 3 is a flow diagram of an example method of biometric authentication.

In some embodiments, the selection module 210 may be configured to select the transformed hamming threshold and/or the initialization data. The initialization data may include a first hamming value and a second hamming value. FIG. 3 is a flow diagram of an example method 300 of biometric authentication, arranged in accordance with at least one embodiment described herein. The method 300 may be performed in a biometric authentication system such as the biometric authentication system 120 of FIGS. 1A and 1B. The method 300 may be programmably performed in some embodiments by the user device 102 described with reference to FIGS. 1A-2. The user device 102 may include or may be communicatively coupled to a non-transitory computer-readable medium (e.g., the memory 222A of FIG. 2) having stored thereon or encoded therein programming code or instructions that are executable by a processor to perform or cause performance of the method 300. Additionally or alternatively, the user device 102 may include a processor (e.g., the processor 224A of FIG. 2) that is configured to execute computer instructions to cause or control performance of the method 300. Although illustrated as discrete blocks, various blocks may be divided into additional blocks, combined into fewer blocks, or eliminated, depending on the desired implementation.

The method 300 may begin at block 302. At block 302, initialization data and/or a transformed hamming threshold may be received. In some embodiments, the initialization data may include a first hamming value and a second hamming value.

At block 304, a registration input may be received. The registration input may include a first raw biometric template and a user identifier. The first raw biometric template may be representative of one or more unique features of a biometric characteristic of a user that is associated with the user identifier. At block 306, a first transformed biometric template may be generated. The first transformed biometric template may be generated by applying a random projection to the first raw biometric template. The first transformed biometric template may be based on a random matrix that is published by an authentication server. The random matrix may include a size, which may include a raw template dimension by a transformed template dimension. The random matrix may also include values of 0 or 1. In the random matrix a probability of a particular element of the random matrix being 1 may be a particular probability.

At block 308, the first transformed biometric template and the user identifier may be communicated to an authentication server. At block 310, a challenge input may be received. The challenge input may include a second raw biometric template and the user identifier. The second raw biometric template may be representative of the one or more unique features of the biometric characteristic of the user or may be representative of one or more unique features of the biometric characteristic of an imposter.

At block 312, a second transformed biometric template may be generated. The second transformed biometric template may be generated by applying a random projection to the second raw biometric template. At block 314, the second transformed biometric template and the user identifier may be communicated to the authentication server. At block 316, a signal indicative of an authentication decision may be received from the authentication server. The authentication decision may be based on an approximate matching between the second transformed biometric template and the first transformed biometric template.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 4:
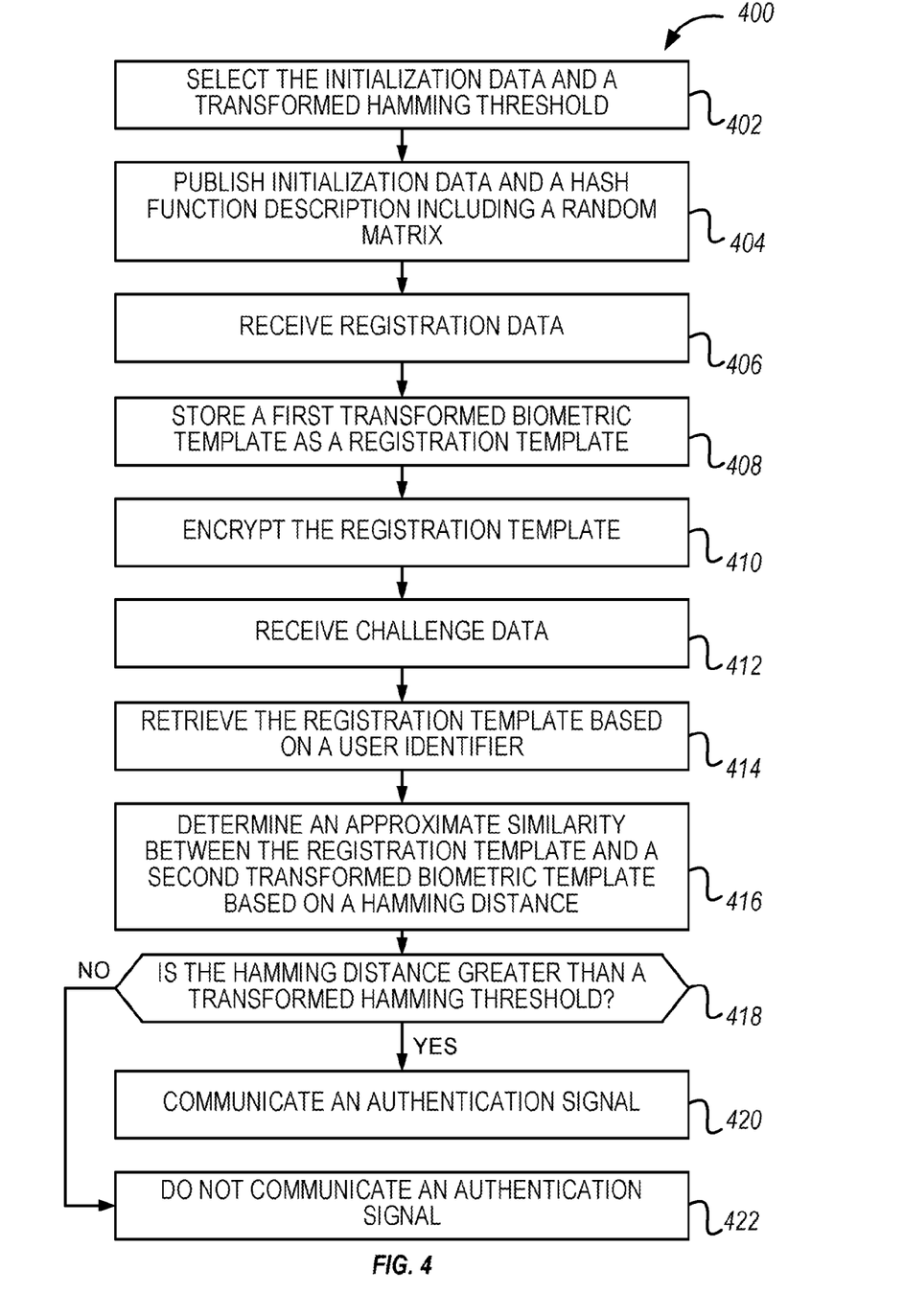
FIG. 4 is a flow diagram of another method of biometric authentication, all arranged in accordance with at least one embodiment described herein.

FIG. 4 is a flow diagram of an example method 400 of biometric authentication, arranged in accordance with at least one embodiment described herein. The method 400 may be performed in a biometric authentication system such as the biometric authentication system 120 of FIGS. 1A and 1B. The method 400 may be programmably performed in some embodiments by the authentication server 140 described with reference to FIGS. 1A-2. The authentication server 140 may include or may be communicatively coupled to a non-transitory computer-readable medium (e.g., the memory 222B of FIG. 2) having stored thereon or encoded therein programming code or instructions that are executable by a processor to perform or cause performance of the method 400. Additionally or alternatively, the authentication server 140 may include a processor (e.g., the processor 224B of FIG. 2) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at 402. At block 402, initialization data and a transformed hamming threshold may be selected. In some embodiments, the initialization data may include a first hamming value and a second hamming value. At block 404, the initialization data and a hash function description may be published or otherwise provided or made available to user devices, such as the user device 102 of FIGS. 1A and 1B. The hash function description may include a random matrix. At block 406, registration data may be received. The registration data may include a first transformed biometric template and a user identifier. The first transformed biometric template may be based on applying a random projection to a first raw biometric template. The random projection may be based on the random matrix. In some embodiments, the random matrix may include a size. The size may include a raw template dimension by a transformed template dimension. The random matrix may also include values of 0 or 1. In the random matrix a probability of a particular element of the random matrix being 1 may be a particular probability.

At block 408, the first transformed biometric template may be stored as a registration template for a user associated with the user identifier. At block 410, the registration template may be encrypted. At block 412, challenge data may be received. The challenge data may include a second transformed biometric template and the user identifier. At block 414, the registration template may be retrieved based on the user identifier.

At block 416, an approximate similarity between the registration template and the second transformed biometric template may be determined. The approximate similarity may be based on a hamming distance. At block 418, it may be determined whether the hamming distance is greater than the transformed hamming threshold. In response to the hamming distance being greater than the transformed hamming threshold ("Yes" at 418), the method 400 may proceed to block 420. At block 420, an authentication signal may be communicated. In response to the hamming distance being less than the transformed hamming threshold ("No" at 418), the method 400 may proceed to block 422. At block 422, an authentication signal may not be communicated.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
   receiving a registration input including a first raw biometric template and a user identifier, the first raw biometric template being representative of one or more unique features of a biometric characteristic of a user that is associated with the user identifier and including a first raw biometric template dimension (n);
   generating a first transformed biometric template by applying a random projection of a random matrix to the first raw biometric template, wherein the first transformed biometric template includes a first transformed template dimension (k) and the random matrix is published such that random matrix is accessible to multiple user devices;
   communicating the first transformed biometric template and the user identifier to an authentication server;
   receiving a challenge input including a second raw biometric template and the user identifier;
   generating a second transformed biometric template by applying the random projection of the random matrix to the second raw biometric template;
   communicating the second transformed biometric template and the user identifier to the authentication server; and
   receiving a signal indicative of an authentication decision from the authentication server, wherein:
   the authentication decision is based on an approximate matching between the second transformed biometric template and the first transformed biometric template, and
   the first transformed biometric template and the second transformed biometric template are configured to provide a privacy guarantee that quantifies access to the first raw biometric template based on the first transformed biometric template, the privacy guarantee being defined according to a privacy guarantee expression:

For any $R \in Z_2^{k \times n}$, given $X_{T'}=RX_T$, $|\{Z_T \in \{0,1\}^n : RZ_T = X_{T'}\}| \geq 2^{n-k}$, in which:

R represents the random matrix,
   $\in$ represents a membership operator;
   $X_T$ represents the first raw biometric template,
   $X_{T'}$ represents the first transformed biometric template,
   $Z_T$ represents a raw biometric template other than XT,
   $\{0,1\}^n$ represents a vector space having a dimension that includes the first raw template dimension, and
   $Z_2^{k \times n}$ represents an integer matrix including integers 0 and 1 having a size (k×n).

2. The method of claim 1, wherein:
   the random matrix includes:
   a size including a raw template dimension by a transformed template dimension; and
   values of 0 or 1, wherein a probability of a particular element of the random matrix being 1 is a particular probability.

3. The method of claim 1, wherein the first transformed biometric template and the second transformed biometric template are members of a vector space having a transformed template dimension.

4. The method of claim 1, wherein the approximate matching is based on a hamming distance between the first transformed biometric template and the second transformed biometric template.

5. The method of claim 1, further comprising receiving initialization data including a first hamming value, a second hamming value, and a transformed hamming threshold, wherein:
   the first hamming value is less than the second hamming value;
   the second hamming value is less than a transformed template dimension;
   when a hamming distance between the first raw biometric template and the second raw biometric template less than the first hamming value, then a probability of a hamming distance between the first transformed biometric template and the second transformed biometric template being greater than the transformed hamming threshold is less than 1 in 10,000; and
   when the hamming distance between the first raw biometric template and the second raw biometric template is greater than the second hamming value, then a probability of the transformed hamming distance between the first transformed biometric template and the second transformed biometric template being less than or equal to the transformed hamming threshold is less than 1 in 10,000.

6. The method of claim 1, wherein:
the first raw biometric template is defined according to an expression $X_T \in \{0,1\}^n$;
the second raw biometric template is defined according to an expression $Y_T \in \{0,1\}^n$;
the first transformed biometric template is defined according to an expression $X_{T'} = RX_T \in \{0,1\}^k$;
the second transformed biometric template is defined according to an expression $Y_{T'} = RY_T \in \{0,1\}^k$, in which:
$Y_T$ represents the second raw biometric template;
$\{0,1\}^k$ represents a vector space having a dimension that includes the first transformed template dimension; and
$Y_{T'}$ represents the second transformed biometric template.

7. A non-transitory computer-readable medium having encoded therein programming code executable by a processor to perform operations comprising:
receiving a registration input including a first raw biometric template and a user identifier, the first raw biometric template being representative of one or more unique features of a biometric characteristic of a user that is associated with the user identifier and including a first raw biometric template dimension (n);
generating a first transformed biometric template by applying a random projection of a random matrix to the first raw biometric template, wherein the first transformed biometric template includes a first transformed template dimension (k) and the random matrix is published such that random matrix is accessible to multiple user devices;
communicating the first transformed biometric template and the user identifier to an authentication server;
receiving a challenge input including a second raw biometric template and the user identifier;
generating a second transformed biometric template by applying the random projection of the random matrix to the second raw biometric template;
communicating the second transformed biometric template and the user identifier to the authentication server; and
receiving a signal indicative of an authentication decision from the authentication server, wherein:
the authentication decision is based on an approximate matching between the second transformed biometric template and the first transformed biometric template, and the first transformed biometric template and the second transformed biometric template are configured to provide a privacy guarantee that quantifies access to the first raw biometric template based on the first transformed biometric template, the privacy guarantee being defined according to a privacy guarantee expression:

For any $R \in Z_2^{k \times n}$, given $X_{T'} = RX_T$, $|\{Z_T \in \{0,1\}^n : RZ_T = X_{T'}\}| \geq 2^{n-k}$, in which:

R represents the random matrix,
$\epsilon$ represents a membership operator;
$X_T$ represents the first raw biometric template,
$X_{T'}$ represents the first transformed biometric template,
$Z_T$ represents a raw biometric template other than XT,
$\{0,1\}^n$ represents a vector space having a dimension that includes the first raw template dimension, and
$Z_2^{k \times n}$ represents an integer matrix including integers 0 and 1 having a size (k×n).

8. The non-transitory computer-readable medium of claim 7, wherein:
the random matrix includes:
a size including a raw template dimension by a transformed template dimension; and
values of 0 or 1, wherein a probability of a particular element of the random matrix being 1 is a particular probability.

9. The non-transitory computer-readable medium of claim 7, wherein the first transformed biometric template and the second transformed biometric template are members of a vector space having a transformed template dimension.

10. The non-transitory computer-readable medium of claim 7, wherein the approximate matching is based on a hamming distance between the first transformed biometric template and the second transformed template.

11. The non-transitory computer-readable medium of claim 7, wherein:
the operations further comprise receiving initialization data including a first hamming value, a second hamming value, and a transformed hamming threshold;
the first hamming value is less than the second hamming value;
the second hamming value is less than a transformed template dimension;
when a hamming distance between the first raw biometric template and the second raw biometric template less than the first hamming value, then a probability of a hamming distance between the first transformed biometric template and the second transformed biometric template being greater than the transformed hamming threshold is less than 1 in 10,000; and
when the hamming distance between the first raw biometric template and the second raw biometric template is greater than the second hamming value, then a probability of the transformed hamming distance between the first transformed biometric template and the second transformed biometric template being less than or equal to the transformed hamming threshold is less than 1 in 10,000.

12. The non-transitory computer-readable medium of claim 7, wherein:
the first raw biometric template is defined according to an expression $X_T \in \{0,1\}^n$;
the second raw biometric template is defined according to an expression $Y_T \in \{0,1\}^n$;
the first transformed biometric template is defined according to an expression $X_{T'} = RX_T \in \{0,1\}^k$;
the second transformed biometric template is defined according to an expression $Y_{T'} = RY_T \in \{0,1\}^k$, in which:
$Y_T$ represents the second raw biometric template;
$\{0,1\}^k$ represents a vector space having a dimension that includes the first transformed template dimension; and
$Y_{T'}$ represents the second transformed biometric template.

13. A method comprising:
publishing initialization data and a hash function description including a random matrix such that random matrix is accessible to multiple user devices;
receiving registration data including a first transformed biometric template and a user identifier, wherein the first transformed biometric template includes a first transformed template dimension (k) and is generated by application of a random projection of the random matrix to a first raw biometric template, and wherein the first raw biometric template is representative of one or more unique features of a biometric characteristic of a user that is associated with the user identifier and includes a first raw biometric template dimension (n);

storing the first transformed biometric template as a registration template for the user;

receiving challenge data including one or more of a second transformed biometric template and the user identifier, the second transformed biometric template is generated by application of the random projection to a second raw biometric template;

retrieving the registration template based on the user identifier;

determining an approximate matching between the registration template and the second transformed biometric template based on a hamming distance; and in response to the hamming distance being below a transformed hamming threshold, communicating an authentication signal to the user device, wherein the first transformed biometric template and the second transformed biometric template are configured to provide a privacy guarantee that quantifies access to the first raw biometric template based on the first transformed biometric template, the privacy guarantee being defined according to a privacy guarantee expression:

For any $R \in Z_2^{k \times n}$, given $X_{T'}=RX_T$, $|\{Z_T \in \{0,1\}^n : RZ_T = X_{T'}\}| \geq 2^{n-k}$, in which:

R represents the random matrix, $\epsilon$ represents a membership operator;

$X_T$ represents the first raw biometric template, $X_{T'}$ represents the first transformed biometric template, $Z_T$ represents a raw biometric template other than XT, $\{0,1\}^n$ represents a vector space having a dimension that includes the first raw template dimension, and $Z_2^{k \times n}$ represents an integer matrix including integers 0 and 1 having a size (k×n).

14. The method of claim 13, wherein the random matrix includes:

a size including a raw template dimension by a transformed template dimension; and values of 0 or 1, wherein a probability of a particular element of the random matrix being 1 is a particular probability.

15. The method of claim 13, further comprising:

in response to the hamming distance being above the transformed hamming threshold, not communicating the authentication signal to the user device.

16. The method of claim 13, wherein:

the first transformed biometric template and the second transformed biometric template are members of a vector space having a transformed template dimension.

17. The method of claim 13, further comprising selecting the transformed hamming threshold and the initialization data including a first hamming value, a second hamming value, and a transformed hamming threshold, wherein:

the first hamming value is less than the second hamming value;

the second hamming value is less than a transformed template dimension;

when a hamming distance between the first raw biometric template and the second raw biometric template less than the first hamming value, then a probability of a hamming distance between the first transformed biometric template and the second transformed biometric template being greater than the transformed hamming threshold is less than 1 in 10,000; and when the hamming distance between the first raw biometric template and the second raw biometric template is greater than the second hamming value, then a probability of the transformed hamming distance between the first transformed biometric template and the second transformed biometric template being less than or equal to the transformed hamming threshold is less than 1 in 10,000.

18. The method of claim 13, wherein:

the first raw biometric template is defined according to an expression $X_T \in \{0,1\}^n$;

the second raw biometric template is defined according to an expression $Y_T \in \{0,1\}^n$;

the first transformed biometric template is defined according to an expression $X_{T'}=RX_T \in \{0,1\}^k$;

the second transformed biometric template is defined according to an expression $Y_{T'}=RY_T \in \{0,1\}^k$, in which:

$Y_T$ represents the second raw biometric template;

$\{0,1\}^k$ represents a vector space having a dimension that includes the first transformed template dimension; and $Y_{T'}$ represents the second transformed biometric template.

19. The method of claim 13, further comprising encrypting the registration template.

20. A non-transitory computer-readable medium having encoded therein programming code executable by a processor to perform operations comprising:

publishing initialization data and a hash function description including a random matrix such that random matrix is accessible to multiple user devices;

receiving registration data including a first transformed biometric template and a user identifier, wherein the first transformed biometric template includes a first transformed template dimension (k) and is generated by application of a random projection of the random matrix to a first raw biometric template, and wherein the first raw biometric template is representative of one or more unique features of a biometric characteristic of a user that is associated with the user identifier and includes a first raw biometric template dimension (n);

storing the first transformed biometric template as a registration template for the user;

receiving challenge data including one or more of a second transformed biometric template and the user identifier, the second transformed biometric template is generated by application of the random projection to a second raw biometric template;

retrieving the registration template based on the user identifier;

determining an approximate matching between the registration template and the second transformed biometric template based on a hamming distance; and in response to the hamming distance being below a transformed hamming threshold, communicating an authentication signal to the user device, wherein the first transformed biometric template and the second transformed biometric template are configured to provide a privacy guarantee that quantifies access to the first raw biometric template based on the first transformed biometric template, the privacy guarantee being defined according to a privacy guarantee expression:

For any $R \in Z_2^{k \times n}$, given $X_{T'}=RX_T$, $|\{Z_T \in \{0,1\}^n : RZ_T=X_{T'}\}| \geq 2^{n-k}$, in which:

R represents the random matrix, $\epsilon$ represents a membership operator;

$X_T$ represents the first raw biometric template, $X_{T'}$ represents the first transformed biometric template,
$Z_T$ represents a raw biometric template other than XT,
$\{0,1\}^n$ represents a vector space having a dimension that includes the first raw template dimension, and
$Z_2^{k\times n}$ represents an integer matrix including integers 0 and 1 having a size (k×n).

21. The non-transitory computer-readable medium of claim 20, wherein the random matrix includes:
a size including a raw template dimension by a transformed template dimension; and
values of 0 or 1, wherein a probability of a particular element of the random matrix being 1 is a particular probability.

22. The non-transitory computer-readable medium of claim 20, wherein the operations further comprise:
in response to the hamming distance being above the transformed hamming threshold, not communicating the authentication signal to the user device.

23. The non-transitory computer-readable medium of claim 20, wherein:
the first transformed biometric template and the second transformed biometric template are members of a vector space having a transformed template dimension.

24. The non-transitory computer-readable medium of claim 20, wherein:
the operations further comprise selecting the transformed hamming threshold and the initialization data including a first hamming value and a second hamming value;
the first hamming value is less than the second hamming value;
the second hamming value is less than a transformed template dimension;
when a hamming distance between the first raw biometric template and the second raw biometric template less than the first hamming value, then a probability of a hamming distance between the first transformed biometric template and the second transformed biometric template being greater than the transformed hamming threshold is less than 1 in 10,000; and
when the hamming distance between the first raw biometric template and the second raw biometric template is greater than the second hamming value, then a probability of the transformed hamming distance between the first transformed biometric template and the second transformed biometric template being less than or equal to the transformed hamming threshold is less than 1 in 10,000.

25. The non-transitory computer-readable medium of claim 20, wherein:
the first raw biometric template is defined according to an expression $X_T \epsilon \{0,1\}^n$;
the second raw biometric template is defined according to an expression $Y_T \epsilon \{0,1\}^n$;
the first transformed biometric template is defined according to an expression $X_{T'} = RX_T \epsilon \{0,1\}^k$;
the second transformed biometric template is defined according to an expression $Y_{T'} = RY_T \epsilon \{0,1\}^k$, in which:
$Y_T$ represents the second raw biometric template;
$\{0,1\}^k$ represents a vector space having a dimension that includes the first transformed template dimension; and
$Y_{T'}$ represents the second transformed biometric template.

26. The non-transitory computer-readable medium of claim 20, wherein the operations further comprise encrypting the registration template.

* * * * *